3,168,539
PROCESS FOR PREPARING SILICEOUS AMINO COMPOUNDS
Frederick J. Ihde, Jr., Mountain Lakes, and Francis J. Licata, West Caldwell, N.J., assignors to Nopco Chemical Company, Newark, N.J., a corporation of New Jersey
No Drawing. Filed Feb. 1, 1961, Ser. No. 86,323
12 Claims. (Cl. 260—404)

This invention relates to a process for preparing siliceous amino compounds. More particularly, this invention relates to a process for preparing siliceous amino compounds using fluosilicic acid and fluosilicate salts.

U.S. Patent 2,967,828, issued January 10, 1961, discloses and claims certain siliceous amino compounds. These materials are prepared by reacting, in an aqueous medium, partial amide salts with water soluble silicate salts in which said silicate salts are present in an amount sufficient to react with all of the acidic components of the partial amide salt. If the silicate salt is present in greater than the aforementioned amount, said amount hereafter being referred to as a stoichiometric amount, then after reaction between the partial amide salt and silicate, the excess silicate salt can be converted to a silicon dioxide by treatment with an acid, and the siliceous amino compound is then adsorbed or complexed upon the surface of the silicon dioxide. This silicon dioxide is referred to as free or uncombined silica or colloidal silica. These materials are characterized by a unique and unexpected property, i.e., when added to an oil or other organic material, the resulting mixture demonstrates an increased viscosity at elevated temperatures which surpasses the initial viscosity of the mixture at room temperature. Also, greases containing same will have lower penetration values at elevated temperatures. Of course, the greater the amount of silicon dioxide present in the composition, the less noticeable will be this property since the silicon dioxide will exert a masking or dilution effect. These siliceous amino compounds after drying and grinding are obtained as white powdery materials, unctuous in texture and having a particle size less than 0.5 micron in diameter. The disclosure in U.S. Patent 2,967,828 is hereby incorporated into the present application by reference.

However, in the preparation in aqueous medium of a siliceous amino compound with a total free and combined silica content of 85% or higher, a number of difficulties were encountered. For instance, excessive filtration rates, increased non-porous aggregate formation, and shrinkage of the filter cake during drying were encountered. The dried non-porous aggregates could not be readily reduced to a fine unctuous powder.

These aforementioned difficulties were largely solved, as described in copending application Serial No. 836,086, Ihde, filed August 26, 1959, now U.S. Patent 3,129,181. This latter mentioned application employed a mixture of water and substantially water insoluble organic liquids in the process of preparing a siliceous amino compound. The disclosure in copending Application Serial No. 836,086 is hereby incorporated into the present application by reference. Where a non-volatile organic liquid was used, the final product contained the organic liquid which has been adsorbed on, and absorbed in, the siliceous amino compound. The removal of the non-volatile organic liquid from the siliceous amino compound could be accomplished, but only at added expense. The removal of the organic liquid might be desired where the siliceous amino compound was to be used in the fields of gas purification, recovery or removal of organic materials from aqueous systems, de-emulsification of aqueous organic systems, and the like.

Where a volatile organic liquid was used, then the problem of solvent recovery was encountered with the resultant economic loss attendant to loss of solvent.

An object of this invention therefor is to provide a process for preparing a siliceous amino compound capable of being more easily ground to a fine particle size.

Another object is to provide a process for preparing a siliceous amino compound, said process not involving excessive filtration rates.

Yet another object is to provide a process for preparing a siliceous amino compound whereby non-porous aggregate formation of the siliceous amino compound particles is greatly reduced.

Still another object is to provide a process for preparing a siliceous amino compound wherein a water insoluble organic liquid need not be necessarily used in said process to overcome excessive filtration rates, increased non-porous aggregate formation, and shrinkage of the filter cake during drying.

Other objects and advantages will become apparent from the following more complete description and claims.

It has been unexpectedly discovered that the above and other objects can be successfully achieved by incorporating in a process for preparing a siliceous amino compound, a water soluble fluosilicate salt or fluosilicic acid.

Broadly, this invention contemplates, in a process for preparing a siliceous amino compound by reacting (1) a material selected from the class consisting of partial amide salts, amine acid addition salts, imidazoline salts, oxazoline salts, and quaternary ammonium salts with (2) a water soluble silicate salt selected from the class consisting of sodium silicates, potassium silicates, and ammonium silicates, the step comprising the addition of a silicate derivative selected from the class consisting of fluosilicic acid, and water soluble fluosilicate salts.

Generally speaking, in the preparation of the siliceous amino compounds, we can use any water soluble or water dispersible partial amide salt. A large number of these salts which we can use and the method of their use are disclosed in U.S. Patent 2,967,828, Ihde, issued January 10, 1961. The disclosures of the above identified patent pertaining to the partial amide salts and their use in preparing a siliceous amino compound are hereby incorporated by reference in the present application. Among the partial amide salts which we may use are the following: the acetate salt of a monoamide, said monoamide having been prepared by reacting tetraethylene pentamine with hydrogenated tallow fatty acids, the acetate salt of the monoamide of behenic acid and diethylene triamine, the phosphoric acid salt of the monoamide resulting from the reaction of dichlorostearic acid with diethylene triamine, and the like. The preparation of partial amide salts in general, and other partial amide salts not specifically mentioned herein, are well known in the art and hence the present invention is not to be construed as limited to the partial amide salts enumerated above, or to any specific method of preparation of partial amide salts.

We can also use any water soluble or water dispersible amine acid addition salt or quaternary ammonium salt with any of the water soluble silicate salts. A number of amines which we can use to form the amine acid addition salts are disclosed in patent application Serial No. 836,086, filed August 26, 1959. Among the primary, secondary, and tertiary amines which we may use to form the acid addition salts are "Primene JM-T," which is a tertiary alkyl primary amine obtainable from Rohm and Haas Co., lauryl amine, dioctyl amine, stearylamine, tricapryl amine, methyl lauryl amine, dimethyl soya amine, diphenylamine, aniline, dimethyl aniline, dibenzylamine, β-phenylethylamine, triethyl amine, methylethylisobutylamine, diisopropylamine and the like. The amine acid addition salts may be formed by treating the amine with an acid in any known conventional manner. The manner of forming the amine acid addition salts and their use in preparing a siliceous amino compound is described in patent application Serial No. 836,086, filed August 26, 1959. This disclosure is hereby incorporated in the present application by reference. However, the present invention is not to be construed as limited to any particular mode of preparation of the amine acid addition salts or to the particular amine acid addition salts heretofore disclosed, as amine acid addition salts and their preparation are well known in the art.

Examples of the quaternary ammonium salts which can be used in preparing the siliceous amino compounds according to the process of this invention are described in iscopending patent application Serial No. 836,086, filed August 26, 1959. Other quaternary ammonium salts are well known in the art and may also be used even though not specifically mentioned herein. Thus the invention is not to be construed as limited to the quaternary ammonium salts hereafter disclosed. Among the quaternary ammonium salts which may be used are dimethyl dioctadecyl ammonium chloride, trimethyl soya ammonium chloride, trimethyl tallow ammonium chloride, dimethyl dicoco ammonium chloride, tetraethylammonium iodide, and the like. The manner of using the quaternary ammonium salts in preparing siliceous amino compounds is disclosed in U.S. patent application Serial No. 836,086, filed August 26, 1959. This disclosure is hereby incorporated by reference into the present application.

We may, in addition, also use oxazoline salts and imidazoline salts or mixtures thereof, in preparing the siliceous amino compounds according to the process of this invention. Oxazoline and imidazoline salts are well known in the art and the invention is not to be construed as limited to the oxazoline and imidazoline salts described below. Among the imidazoline and oxazoline salts which may be used are the salt of the imidazoline of two moles of stearic acid and one mole of diethylenetriamine, the salt of the oxazoline of one mole of monoethanolamine and one mole of lauric acid, and the like. Among the acids which may be used to form the salts of the imidazolines and oxazolines are, phosphoric acid, acetic acid, hydrochloric acid, sulfuric acid, and the like, and where an organic solvent is used, we may also use butyric acid, propionic acid, and the like. However, it will be apparent to those skilled in the art that the invention need not be limited solely to the use of these specific acids heretofore named.

The silicate salts employed in the process of this invention can be any of the various forms of sodium silicate, potassium silicate and ammonium silicate which are water-soluble or substantially water-soluble. Examples of useful silicate salts are sodium metasilicate, (Na$_2$O:SiO$_2$)

sodium orthosilicate (2Na$_2$O:SiO$_2$), or any other water-soluble sodium silicate, such as, sodium silicate having the composition Na$_2$O:4SiO$_2$ can be used, potassium silicate (K$_2$O:SiO$_2$) and (K$_2$O:3.91SiO$_2$), potassium tetrasilicate (K$_2$O:4SiO$_2$.H$_2$O) or any other water-soluble potassium silicate. The preferred products, however, are produced by reacting the partial amide salt with sodium silicate having the composition Na$_2$O:3.22SiO$_2$. Water soluble or substantially water-soluble silicate salts are well known in the art and the invention is not to be construed as limited to the silicate salts disclosed above.

Where it is desired to use an organic liquid, we may use any organic liquid which is water insoluble or substantially water insoluble in preparing the siliceous amino compounds as is disclosed in patent application Serial No. 836,086, filed August 26, 1959. This disclosure is hereby incorporated by reference in the present application. Generally speaking, if an organic liquid is to be used, it should be present before or during the formation of the siliceous amino compound because it has been found that when it is so present, it favorably influences the fine particle formation of the siliceous amino compounds. The organic liquid can be one of many materials so long as it has the property of being a water insoluble or substantially water insoluble, inert organic liquid. The wide selection of liquid organic materials which can be used herein is attributable to the very high capacity of the siliceous amino compounds for adsorbing organic liquids. A partial list which is exemplary of suitable organic liquids which are water insoluble or substantially water insoluble is as follows: aliphatic monohydroxy alcohols such as n-butanol, hexanol, heptanol; ketones such as dibenzyl ketone and methyl isobutyl ketone, aldehydes such as caproaldehyde and capricaldehyde; hydrocarbons such as benzene, xylene, toluene, Tetralin, cyclohexane, Decalin, kerosene, naphtha, Varsol, and other mixtures of hydrocarbons having variable boiling ranges depending upon their specific constituents; halogenated hydrocarbons such as perchlorethylene, ethylene dichloride, carbon tetrachloride, and butyl chloride; animal, vegetable and fish oils such as tallow, peanut, coconut, herring, sardine, and linseed oils; esters such as methyloleate, dioctylphthalate, dioctyl sebacate, tributyl phosphate, tricresyl phosphate and dibutyl carbonate; silicones such as methyl polysiloxane; phenols such as nonylphenol, dioctylphenol and said phenols condensed with up to 2 mols of ethylene oxide; water insoluble polyoxyalkylene glycols and derivatives thereof such as water insoluble polyoxypropylene glycols and their derivatives such as the water insoluble "Ucons," glycol ethers such as ethylbutyl "Cellosolve," and phenyl "Cellosolve"; acetals such as dichlorethyl formal; fluocarbons such as C$_5$ fluoalcohols; ethers such as butyl ether and dichlorethyl ether; mercaptans such as butyl mercaptan and thiocresol; pyridine borane; tributyl borane and the like. Also, materials which are solids at room temperature but which can be liquified under our operating temperatures, can be used, e.g. eicosane, and paraffin wax.

It should be understood that the use of these organic liquids is optional. That is, our invention brings about the improved results even when such liquids are not used.

When preparing the silica gel and when converting the excess silicate salt remaining after formation of the siliceous amino compound to silicon dioxide, an acid is used. In general, any organic or inorganic acid which is capable of converting the silicate salt to silicon dioxide and a readily water-soluble salt of the acid can be used in the process of this invention. Aliphatic carboxylic acids containing up to about 6 carbon atoms and dicarboxylic acids have been found suitable. However, mineral acids are preferably employed. Thus, acids such as acetic acid, propionic acid, butyric acid, caproic acid, oxalic acid, hydrochloric acid, phosphoric acid, and sulfuric acid are especially well suited for such use. However, it will be apparent to those skilled in the art that the invention need not be limited solely to the use of these specific acids heretofore named.

The use of a water soluble inorganic fluosilicate or fluosilicic acid in the process of this invention, enables us to obtain a siliceous amino compound which is easier to grind to a fine particle and which has improved oil thickening properties thereby decreasing the amount of additive required to obtain a grease of a given consistency. In addition, the use of the water soluble inorganic fluosilicates or fluosilicic acid in the process of this invention enables us to filter the siliceous amino compound from the reaction mixture at a faster rate of filtration than when the fluosilicate or fluosilicic acid is not present.

The fluosilicate or fluosilicic acid should be present either before or during the formation of the siliceous amino compound. When it is not so present, we have found that there is not a great enough improvement in the siliceous amino compound product to make this improved process economically feasible.

In the process of our invention, we may use fluosilicic acid and water soluble fluosilicates such as sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate, and the like.

The fluosilicic acid or fluosilicate can be present in amounts of up to about 10 percent of fluosilicic acid or fluosilicate based on the total weight of fluosilicic acid or fluosilicate plus the theoretical yield of the siliceous amino compound and free silica, if any. We have found that if it is present in amounts of more than about 10 percent, then there is not a sufficient improvement in the siliceous amino compound in relation to the amount of fluosilicic acid or fluosilicate used, to make our process economically feasible, however, amounts in excess of 10 percent may be used if desired.

We prefer to use 5 percent of fluosilicic acid or fluosilicate because we have found that the siliceous amino compound product is a steadily improved one as the amount of additive is increased to 5% whereupon optimum improvement is obtained. When the additive is used in amounts above 5%, we still obtain an improved product, but it is not as improved a product as when 5% is used. As the amount of fluosilicic acid or fluosilicate increases from 5% to 10%, the product remains improved in comparison with a product prepared by a process wherein no fluosilicic acid or fluosilicate was added; however, as the amount of additive used increases from 5% to 10%, the product becomes increasingly less improved as compared to a process utilizing 5%.

The process itself may be carried out by preparing separate aqueous solutions of a water soluble or water dispersible silicate and of an acid, and then adding the two solutions at the same time, to an aqueous solution of the fluosilicate or fluosilicic acid. At this point, it should be mentioned that when the solution of the acid is added to the solution of the water soluble or water dispersible silicate, the acid should always be kept in excess to assure that silicon dioxide will not excessively polymerize. It is well known that silicon dioxide polymerizes less in an acid system than in an alkaline system. The reaction mixture is then agitated for varying periods of time at elevated temperature. Heating helps build up the particle size, or/and porous aggregate particle formation, as does the period of digestion. While we may use temperatures ranging from the freezing point of water or of a water-organic solvent system if used, up to the boiling point of the system used, and periods of digestion ranging from no digestion at all up to any digestion period desired, we prefer to utilize temperatures of from 20° C. to 95° C. and digestion periods of from 20 to 72 hours as we have found that these ranges give us a desirable silica particle. However it should be understood that temperature and time of digestion may be varied by one skilled in the art and still be within the scope of this invention. Naturally, the temperature cannot exceed the boiling point of the solute-solvent system, and where an organic water insoluble liquid is used, then the boiling point of the lower boiling component or azeotrope cannot be exceeded at atmospheric pressure, however, temperatures above the boiling point of the lowest boiling component may be employed in a greater than atmospheric pressure system.

The partial amide salt as well as the other salts such as a quaternary salt, etc., is then formed in a separate vessel and also another aqueous solution of the water soluble or water dispersible silicate is prepared separately. These two solutions are then added, at the same time, to the silica gel or sol which is the result of the addition of the acid solution to the fluosilicate or fluosilicic acid solution and the water soluble or water-dispersible silicate salt.

It is at this point, that is, when the siliceous amino compound is formed that a water insoluble organic liquid must be present if this embodiment is to be utilized. If the organic liquid is not present at this time, then the organic liquid will not have the desired optimum effect on the siliceous amino compound.

The pH of the entire reaction mixture is then adjusted to between 6.5 and 9.5 by the addition of a water soluble acid. If the pH is below 6.5 then decomposition of the siliceous amino compound may occur. We have found that at a pH of above 9.5 we do not obtain maximum oil absorption by our product when a water insoluble organic liquid is used.

The adjusted reaction mixture is then digested for from no digestion period at all to a digestion period of 72 hours, at room temperature in order to obtain the desired particle size. The period of digestion may be varied by one skilled in the art in order to obtain the desired particle size. The slurry is then filtered, and the filter cake washed with water and dried.

Optionally, additives may be used in the process to inhibit polymerization or to accelerate polymerization of silica. For example, sodium chromate, and the like may be added to the solution of the water soluble or water dispersible silicate, as polymerization inhibitors, and sodium molybdate and the like may be added as polymerization accelerators. Sodium chloride and the like may be used to keep the silica gel fluid. Formaldehyde and the like may be used to modify the structure of the siliceous amino compound. These as well as other additives, not specifically mentioned herein are known in the art, and hence the present invention is not to be construed as being limited to such feature.

The precise nature of the reaction of the silicate salt and the salt of the partial amide as well as the other salts, such as the amine acid addition salts, etc., is not known. It is believed that the sodium, potassium or ammonium ions of the silicate salt form a salt with the acid radicals of the partial amide salt and that the silica portion of the silicate salt combines with the amino nitrogen atoms of the partial amide reactant to produce the siliceous amino compound. However, the above theory should not be construed as limiting the scope of the invention.

In producing the siliceous amino compounds, the silicate salt is employed in quantities which are at least stoichiometrically equivalent to the quantity of partial amide salt or of another salt, such as an imidazoline salt, etc., with which it is to be reacted. For the purpose of this invention, a stoichiometrically equivalent quantity is that quantity of silicate salt which will provide sufficient sodium, potassium or ammonium ions to neutralize all of the acid radicals of the partial amide salt or of another salt, such as an oxazoline salt, etc.

The preferred products of the invention are, however, produced by using quantities of silicate salt in excess of the stoichiometrically equivalent amount. The excess silicate salt is then converted with acid to silicon dioxide and the water-soluble sodium, potassium, or ammonium salt of the acid. This silicon dioxide is also referred to as colloidal silica and includes silica gel, silicic acid, or hydrated silica. When, in the practice of this invention, excess silicate salt is employed, the silicon dioxide which is produced, when and if the reaction mixture is subsequently treated with acid, becomes dispersed in the reaction mixture. The siliceous amino product resulting from the reaction of the silicate salt and the partial amide salt is adsorbed on the silicon dioxide or complexed therewith. The water-soluble sodium, potassium, or ammonium salt of the acid which is produced as the incidental reaction product of this acid-treating step is soluble in the aqueous portion of the reaction medium and is removed from the water-insoluble product of the invention when the product is separated from the reaction medium as for example by filtering and washing. In this embodiment, the combined silica is present in the final product in an amount so that it plus the uncombined silica comprises up to 95% by weight of the final product, based upon the total weight of partial amide or quaternary ammonium compound, etc., combined and uncombined silica. In preparing this embodiment, the partial amide salt or other salts, such as the amine acid addition salt, etc., and a stoichiometrically equivalent amount of silicate solution can be added simultaneously to a solution already containing colloidal silica such as silica gel, silica sol or pyrogenic silica. The preparation per se of silica gels and sols is well known in the art and such preparation does not form a part of the present invention. Another variant is to add the partial amide salt or other salt such as an oxazoline salt, etc., to a silicate solution in which a portion of the silicate salt has been converted to a gel or sol and the remaining unconverted silicate salt is stoichiometerically equivalent to the amount of partial amide salt or other salt, such as an oxazoline salt, etc., which is introduced. Also, if desired, the partial amide salt or other salt such as the quaternary ammonium salt, etc., can be introduced into water with agitation, simultaneously with a stoichiometric excess of soluble silicate and sufficient acid to convert the excess silicate to the free silica. Another procedure is to introduce the partial amide salt or other salt such as an amine acid additional salt, etc., plus excess silicate salt into a solution of a gel or sol which was prepared under acid conditions and thereby contains the acid necessary to convert the excess silicate salt to silica. Thus, it can be seen that the uncombined silica can be introduced before, during or after the formation of the siliceous amino compound.

If an organic liquid is to be used, it is preferably present during the formation of the siliceous amino compound so that it can favorably influence fine particle formation. That is, the organic liquid is introduced at the time of, or prior to, the formation of the siliceous amino compound. For instance, the partial amide or other compound, such as the quaternary ammonium compound, etc., can be dissolved into the organic liquid and thereafter the acid can be added to form the salt, following which, water is introduced until a uniform dispersion is formed, or the salt can be formed in the organic liquid and no water added. Alternatively, the partial amide salt or other salt such as an oxazoline salt, etc. is formed in aqueous solution and then the organic liquid is dispersed therein. In these alternatives, the organic liquid will be present when the partial amide salt or other salt as aforementioned is reacted with the water soluble silicate. Also, the siliceous amino compound can be prepared in aqueous medium, added to the silica sol or gel and then the organic liquid introduced. If the organic liquid is added after both the silica and siliceous amino compounds are formed, it will aid filtration and reduce aggregate formation during drying even though it has been added at a time after which it favorably influences fine particle formation.

The preparation of these siliceous amino compounds can be carried out under atmospheric pressure using a wide range of temperatures, i.e., from just above the freezing point of the highest freezing component to just below the boiling point of the lowest boiling component or azeotrope if a water-organic liquid mixture is used. If a non-volatile organic liquid is used, the maximum temperture would be the boiling point of the water present which would be the lowest boiling component. The higher temperatures, e.g. of the order of 75° C. are preferred in order to obtain uniform distribution of the siliceous amino compounds. That is, under the higher temperatures if any of the partial amide or other compounds such as a quaternary ammonium compound, etc., should precipitate out as large particles, gummy masses, small lumps, it will readily redisperse. If desired, the preparation can be carried out at superatmospheric pressures by using an autoclave. In such instances, of course, the temperatures are not limited to the boiling point of the lowest boiling component or azeotrope of the water-organic liquid mixture, if such a mixture is used.

Other variations in the process are as follows. The digestion period of the silica is optional and is carried out to build up the silica particles to a size desired for oil and solvent thickening which is of value in grease making. The amount of water which is used may be varied widely. Enough should be used, however, to keep the system containing the siliceous amino compound in the form of an easily mixable slurry. As pointed out previously, the partial amide salt, or other salts as aforementioned can be prepared in the absence of water and the silicate salts which are reacted with the partial amide salts or other salts such as amine acid addition salts, quaternary ammonium salts, oxazoline salts and imidazoline salts, can be introduced as solid materials. The washing of the filter cake comprising the siliceous amino compound can be either batchwise or continuous or, if the siliceous amino compound and inert water insoluble organic liquid, if used, separate from the water layer, then the water layer can be decanted or removed in any other suitable manner without filtering the slurry at any stage of the recovery of the siliceous amino compound. After the final washing, the filter cake or siliceous amino compound layer, if filtration has not been used, can be slurried and milled, e.g., using a ball mill, roll mill, colloid mill or homogenizer to reduce the particle size. The drying methods can vary, i.e., tray drying vacuum drying, spray drying or drying while grinding can be used. After drying, mills such as a hammer mill, jet mill, attrition mill can be used to reduce the siliceous material. Moreover, if a fine silica free from organic material is desired, the siliceous amino compound, whether or not it contains uncombined silica, can be ignited before or after drying. Finally, the product can be irradiated, e.g., by exposure to gamma (cobalt 60 source) or neutron (nuclear reactor) irradiation prior to grinding in order to aid the formation of fine particles.

Also, if a volatile organic liquid is used, it can be removed at any point after the product, in the form of its filter cake, is collected. Such product is referred to as an unoiled siliceous amino compound. Removal can be done during the drying, by flash evaporation or by stepwise replacement with more volatile organic solvents. When a non-volatile organic liquid is used, the final product is referred to as an oiled siliceous amino compound.

It, of course, should be realized that regardless of the procedures utilized in preparing the siliceous amino compound such as those set forth above, the fluosilicic acid or water soluble fluosilicate salts can be added at any stage, prior to or simultaneously with, the formation of the siliceous amino compound so long as it is present at the time of formation of the siliceous amino compound.

The silica portion of the silicate salt which is utilized in the formation of the siliceous amino compound is referred to as combined silica. Any excess silicate salt which is converted to silicon dioxide is referred to as free or uncombined silica or colloidal silica.

Wherever percent shrinkage of the filter cake is given, these values are percent by volume. Wherever penetration values are set forth, the procedure, A.S.T.M. cone pentration D217-52T was used. Wherever the grease was worked prior to penetration determinations, this was done by a motor driven grease worker described in A.S.T.M. D217-52T. Whenever the Saybolt Universal Viscosimeter was used in determining viscosity, it was used according to A.S.T.M. D88-38.

Wherever bulking values are given, these values were determined by placing a ground ten gram sample of the siliceous amino compound in a 100 cc. graduated cylinder and measuring and recording the volume this ten gram sample occupied. If the volume of the ten gram sample exceeds 100 cc., then a five gram sample is used and the bulking value is multiplied by two. The graduated cylinder is then tapped sixty times on a hard surface, and the volume which the ten gram sample occupied after tapping is recorded. Where bulking values are given, the first number is the volume the ten gram sample occupied before tapping and the second number is the volume the ten gram sample occupied after tapping. Generally speaking, the higher the pair of bulking values, the finer the particle size of the siliceous amino compound obtained.

Where penetration values are given, the grease was composed of 10% siliceous amino compound and 90% oil, based on the total weight of the grease. It should be noted that the lower the penetration value is, the harder the grease is. Also, the harder the grease, in greases containing an equal percentage of siliceous amino compound, the finer the siliceous amino particles are, and/or the more porous are the particle aggregates. Note that the greater the porosity, the greater is the surface area of the aggregates.

Reference will be made in the examples to filtration rates. Generally speaking, the faster the rate of filtration, the finer the siliceous amino particles are, and/or the more porous and the larger is the surface area of the particle aggregates.

Reference in the examples is also made to shrinkage of the filter cake after drying. As a general rule, the less the amount of shrinkage after drying, the more porous and finer is the siliceous amino particle.

In order to more fully illustrate the nature of this invention and the manner of practising the same, the following examples are presented.

EXAMPLE I (A) *Preparation of the silica gel*

In this example, 5.0 grams of sodium fluosilicate were dissolved in 2,000 cc. of water at 75° C. to 80° C. To this sodium fluosilicate solution was added 200 g. of a 40° Bé solution of sodium silicate ($Na_2O:3.22SiO_2$) diluted in 200 cc. of water and 35.0 g. of sulfuric acid (96%) dissolved in 190 cc. of water. The sodium silicate solution and sulfuric acid solution were added at the same time to the solution containing sodium fluosilicate. Care was taken during the addition to keep the sulfuric acid solution in excess at all times so that the reaction mixture was at all times acid to Congo red paper.

The resultant fluid silica gel was mixed at 80° C. to 85° C. for 1 hour, during which time it became cloudy.

The silica gel was then digested for 22 hours at room temperature and subsequently heated to a temperature of from 80° C. to 85° C.

(B) *Preparation of the partial amide salt*

A solution of 10.0 g. of the monoamide of hydrogenated tallow fatty acids and aminoethylethanolamine was prepared by dissolving the monoamide in 100 g. of naphthenic base oil (300 Second Saybolt viscosity) at a temperature of 80° C. to 85° C. To this solution was then added 2.6 g. of glacial acetic acid in order to form the monoamide acetate. The reaction mixture was then emulsified with 85 cc. of water at 90° C. to 95° C.

(C) *Preparation of the siliceous amino compound*

A dilution of 100 g. of a 40° Bé solution of sodium silicate ($Na_2O:3.22SiO_2$) was prepared by adding thereto 100 cc. of water.

The partial amide salt emulsion of preparation (B) and the sodium silicate solution of preparation (C) were added at the same time to the silica gel of preparation (A). The temperature of the silica gel of preparation (A) was maintained at 80° C. to 85° C. during the addition. When adding the reactants to the silica gel of preparation (A), care was taken to maintain an excess of the partial amide salt at all times in order to minimize heavy gel formation.

A fine creamy yellow dispersion formed. The pH of the reaction slurry was measured and was found to be 8.1 and was adjusted to a pH of 7.4 with sulfuric acid.

The adjusted slurry was mixed for one half hour at 80° C. to 85° C. and was subsequently digested for 22 hours at room temperature.

(D) *Recovery of the siliceous amino compound*

The digested siliceous amino compound slurry was then heated with agitation to a temperature of 80° C. to 85° C. and was filtered.

The filter cake was washed four times to remove water soluble salts. This was accomplished by mixing the filter cake for twenty minutes with 1,500 cc. of water, which was at a temperature of 75° C. to 80° C., and then filtering the slurry.

The filtration rates were from 1 to 1½ minutes for 1,000 cc. of filtrate, filtered through an eight inch Buchner funnel at a vacuum of from twenty-five to twenty-eight inches.

The washed siliceous amino compound was dried at a temperature of from 120° F. to 125° F. for 61 hours. The moisture content after drying was 0.6%. After drying, it was determined that the filter cake had shrunk by 35.5%. The product dried to agglomerated chunks which ground very readily to a fine powder.

The bulking value was 53 cc./50 cc. for a ten gram sample of the product. The yield of product was 190 grams.

A mixture composed of 10% of the siliceous amino compound and 90% of a 300 Sec. Saybolt viscosity naphthenic base oil was homogenized and thickened to 40,000 centipoises with an A.S.T.M. grease penetration value of 365.

We can use zinc fluosilicate in place of the sodium fluosilicate used in this Example I, repeating the procedure of this example, and we would obtain the same beneficial effects as when sodium fluosilicate was used.

A similar formulation wherein a siliceous amino compound prepared as above but without using any fluosilicate or fluosilicic acid, had an A.S.T.M. grease penetration value of 405 and a Brookfield viscosity value of only 16,160 centipoises.

This comparison and the tests performed demonstrate that when fluosilicic acid or a fluosilicate according to this invention is used in a process of preparing a siliceous amino compound, the siliceous amino particles produced thereby are much finer and/or have more surface area than when no fluosilicic acid or fluosilicate is used.

It should be noted here, that the finer the particle of the siliceous amino compound obtained, the more improved are the grease making properties of the siliceous amino compound.

EXAMPLE II

The purpose of this example is to illustrate that the fluosilicate or fluosilicic acid may be added at other stages of the preparation; however it should be present at the time of the formation of the siliceous amino compound.

(A) *Preparation of the silica gel*

The silica gel was prepared as in Example I, except that no fluosilicic acid or fluosilicate was added in the preparation of the silica gel. The sodium silicate solution and diluted sulfuric acid solution were added to 1700 cc. of water, instead of the 2,000 cc. of water used in Example I, in the manner of Example I. Throughout the addition of these solutions to the water, the acid was kept in excess.

(B) *Preparation of the partial amide salt*

The partial amide salt was prepared as in Example I, except that the temperature of the naphthenic base oil was 70° C. to 75° C. and 5.0 grams of sodium fluosilicate dissolved in 300 cc. of boiling water was added to the emulsion containing the partial amide salt.

11

(C) *Preparation of the siliceous amino compound*

The siliceous amino compound was prepared as in Example I, except that 75 grams of a 40° Bé. solution of sodium silicate (Na$_2$O:3.22SiO$_2$) dissolved in 75 cc. of water was used. The pH of the reaction slurry containing the siliceous amino compound was measured and was found to be 6.9. This was adjusted to a pH of 7.4 by the addition of sodium hydroxide. The resultant slurry was mixed as in Example I, but it was subsequently digested for 20 hours at room temperature.

(D) *Recovery of the siliceous amino compound*

The siliceous amino compound was recovered as in Example I, except that the digested siliceous amino compound slurry was heated to a temperature of 75° C. to 30° C. and then filtered. The filter cake was washed as in Example I and filtered through an 8 inch Büchner funnel at a vacuum of from 25 to 23 inches. The filtration rate was from 1 to 2 minutes for 1,000 cc. of filtrate. The washed siliceous amino compound was dried at a temperatures of from 125° F. to 130° F. for 43 hours. The moisture content after drying was 0.4%. After drying, its was determined that the filter cake has shrunk by 35.5%. The bulking value was 40 cc./33 cc. for a 10 gram sample of the product. The yield of product was 192.5 grams. A homogenized solids mixture composed of 10% siliceous amino compound and 90% of a 300 Sec. Saybolt viscosity naphthenic base oil had a Brookfield viscosity of 17,472 centipoises and an A.S.T.M. grease penetration value of 395.

This Example II demonstrates that the fluosilicate or fluosilicic acid may be added at different stages of the process. However, it should be again noted that the fluosilicic acid or fluosilicate should be present either before or during the formation of the siliceous amino compound to assure beneficial results. The procedure of this Example II resulted in a product which, while not superior to the product obtained in Example I, was superior to a product obtained by a process wherein no fluosilicic acid or fluosilicate was incorporated therein.

EXAMPLE III (A) *Preparation of the silica gel*

The procedure of Example I was repeated in the manner of Example I, except that the sulfuric acid solution and sodium silicate solution were added to a mixture of 2,000 cc. of water, 100 grams of Hi Flash Naphtha, and 100 grams of naphthenic base oil (300 Sec. Saybolt viscosity). The resultant slurry was mixed for 15 minutes and 2.5 grams of sodium fluosilicate was added thereto. The silica gel was digested for 22 hours and was then agitated, while heating to a temperature of 75° C. to 80° C.

(B) *Preparation of the partial amide salt*

The partial amide salt was prepared as in Example I.

(C) *Preparation of the siliceous amino compound*

The siliceous amino compound was prepared as in Example I, and the siliceous amino compound slurry had a pH of 9.1. This was adjusted to a pH of 7.35 with sulfuric acid. The reaction slurry was agitated at 75° C. to 80° C. for one hour and was again agitated while being allowed to cool to a temperature of 50° C. The manner of digestion remained the same.

(D) *Recovery of the siliceous amino compound*

The reaction slurry was heated to between 70° C. and 80° C. and was filtered and washed as in Example I. The filtration rate was less than ½ minute for 1,000 cc. of filtrate. The filter cake was dried at a temperature of from 150° F. to 155° F. for 24 hours until a moisture content of 0.77% was obtained. Shrinkage of the filter cake during drying was 23.3%. The yield of product was 185 grams.

12

EXAMPLE IV (A) *Preparation of the silica gel*

The procedure of Example III was repeated except that 10.0 grams of sodium fluosilicate and 40.2 grams of 96% sulfuric acid were used. After the silica gel had been digested for 22 hours, 500 cc. of water was added thereto in order to aid in dispersing the silica gel during agitation.

(B) *Preparation of the partial amide salt*

The partial amide salt was prepared as in Example I.

(C) *Preparation of the siliceous amino compound*

The siliceous amino compound was prepared as in Example I. The pH of the siliceous amino compound slurry was 5.0 and it was adjusted to 7.5 by the addition of 5.0 grams of sodium silicate solution and 20.0 grams of 50% sodium hydroxide solution.

(D) *Recovery of the siliceous amino compound*

The siliceous amino compound was recovered as in Example I. The filtration rate was from 1 to 1½ minutes for 1,000 cc. of filtrate under the conditions stated in Example III. The filter cake shrinkage during drying was 42.1%. The yield was 200 grams of a soft porous powdery cake which ground readily.

EXAMPLE V

The purpose of this Example V is to illustrate the use of other additives as well as the use of other process variables, in preparing a siliceous amino compound according to this invention.

(A) *Preparation of silica sol*

The silica sol was prepared substantially in the same manner as the silica gel of Example I except that 2.5 grams of sodium fluosilicate was dissolved in 2,200 cc. of water at room temperature. A dilution of 250 grams of a 40° Bé. solution of sodium silicate (Na$_2$O:3.22SiO$_2$) was prepared with 250 cc. of water. Sodium carboxymethyl cellulose, 200 grams of a 5% solution, was added to the sodium silicate solution to retard agglomeration of the silica particles and was mixed therein at a temperature of 60° C. A solution of 50 grams of 96% sulfuric acid was dissolved in 190 cc. of water. The sodium silicate-sodium carboxymethyl cellulose solution, and the diluted sulfuric acid were added at the same time to the sodium fluosilicate solution under the same conditions as in Example I. The clear silica sol was then heated to 60° C.

(B) *Preparation of the partial amide salt*

The procedure of Example I was repeated except that 12.5 grams of the monoamide of hydrogenated tallow fatty acids and aminoethylethanolamine in 125 grams of the naphthenic base oil of Example I, and 3.7 grams of glacial acetic acid were used.

(C) *Preparation of the siliceous amino compound*

The procedure of Example I was repeated except that 152.5 grams of a 40° Bé. sodium silicate

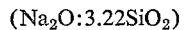

solution was added to 152.5 cc. of water. The diluted sodium silicate solution of this preparation C was added to the silica sol when the clear silica sol had been heated to a temperature of 60° C. The monoamide acetate salt was kept in excess at all times during this addition. The resultant smooth creamy slurry was heated to a temperature of 64° C. The pH of the slurry was 7.8 and was adjusted to 7.5 with sulfuric acid. The adjusted slurry was agitated at a temperature of 62° C. for 15 minutes and was then digested for 22 hours at room temperature after which it was heated to 85° C. and was filtered.

(D) Recovery of the siliceous amino compound

The filter cake was washed four times with 1500 cc. of water at a temperature of 70° C. to 75° C. by agitating the product for 20 minutes in the water and filtering the same. The filter cake was dried at 135° F. to 150° F. for 24 hours. The moisture content was 0.5%. The yield was 240 grams.

EXAMPLE VI

The purpose of this example is to show that imidazoline and oxazoline salts or mixtures thereof, can be used to prepare a silceous amino compound according to the process of this invention.

(A) Preparation of the silica sol

A silica sol was prepared in the same manner as the silica gel of Example I, except that 1.0 gram of sodium fluosilicate was dissolved in 2,400 cc. of water, 282.5 grams of a 40° Bé. sodium silicate ($Na_2O:3.22SiO_2$) solution was diluted in 282.5 cc. of water, and 50 grams of 96% sulfuric acid was added to 250 cc. of water. The resultant clear silica sol was then mixed for ½ hour.

(B) Preparation of oxazoline and imidazoline salts 6.25 grams of the imidazoline prepared from one mole of coconut fatty acids and one mole of aminoethylethanolamine, and 6.25 grams of "Alketerge C," which is a substituted oxazoline obtained from Commercial Solvents Corporation were added to 55 grams of the naphthenic base oil of Example I. The addition was accomplished at a temperature of 40° C. to 50° C. To this reaction mixture was then added 3.7 grams of glacial acetic acid and the reaction mixture was heated to a temperature of from 90° C. to 100° C.

(C) Preparation of the siliceous amino compound

A 40° Bé. solution of sodium silicate ($Na_2O:3.22SiO_2$), 120 grams, was added to 120 cc. of water. The imidazoline-oxazoline salts prepared in paragraph B and the diluted sodium silicate solution of this paragraph C were added at the same time to the silica sol of preparation A. Care was taken to assure that the imidazoline-oxazoline salts were always in excess. The pH of the reaction mixture was 7.1 and was adjusted to 7.3 by the addition of sodium hydroxide. The entire reaction mixture was agitated for one hour and was then digested for 20 hours at room temperature.

(D) Recovery of the siliceous amino compound

The slurry was heated to a temperature of from 65° C. to 75° C., filtered, and washed as in Example V except that 20 grams of the naphthenic base oil referred to in Example I was added to the first wash of this preparation in order to reduce granulation of the product. The filter cake was dried at a temperature of from 150° F. to 155° F. Yield of product was 260 grams and the product was readily and easily ground to a fine powder.

EXAMPLE VII

The purpose of this example is to illustrate the use of other monoamides, other fluosilicates, other additives, and oil, in preparing a siliceous amino compound according to this invention.

(A) Preparation of the silica sol

To 2,000 cc. of water was added 2.5 grams of sodium fluosilicate and 5.0 grams of magnesium sulfate in order to form magnesium fluosilicate. 125 grams of a 40° Bé. sodium silicate solution ($Na_2O:3.22SiO_2$) was diluted with 125 cc. of water. To 108 cc. of water was added 22.5 grams of 96 percent sulfuric acid. The sodium silicate solution and the diluted sulfuric acid were added at the same time to the magnesium fluosilicate solution. The entire mixture was agitated during the addition and the sulfuric acid was kept in excess as in Example I. The silica sol remained clear up to a temperature of 70° C. At 75° C. a slight bloom developed.

(B) Preparation of the partial amide salt 6.25 grams of the monoamide of aminoethylethanolamine and "AB Acids," manufactured by Archer-Daniels-Midland Co. and consisting mainly of saturated $C_{20}$ and $C_{22}$ fatty acids with lesser amounts of $C_{14}$ to $C_{18}$ saturated fatty acids, was dissolved in 100 grams of xylene at a temperature of 60° C. to 65° C. To this mixture was then added 1.75 grams of glacial acetic acid. A clear solution resulted.

(C) Preparation of the siliceous amino compound 76.25 grams of a 40° Bé. sodium silicate $$(Na_2O:3.22SiO_2)$$

was added to 76.25 cc. of water. The partial amide salt of paragraph B and the sodium silicate dilution of this paragraph C were added at the same time to the silica sol of paragraph A. The addition was accomplished at 85° C., care being taken to keep the partial amide salt in excess at all times. The partial amide salt was added over a period of ¼ hour and the sodium silicate solution was added over a period of ½ hour. At this time, 200 grams of V.M. and P. Naphtha, a petroleum boiling at about 200° F. to 300° F., was added to the slurry and the entire mixture was allowed to cool to 64° C. The pH of the reaction slurry was 8.25 and was adjusted to 7.65 by the addition of sulfuric acid. The slurry was then digested for 20 hours at room temperature, subsequently heated to 90° C., 500 grams of V.M. and P. Naphtha added to the slurry, and 100 grams of sodium chloride was then added to prevent the formation of a heavy solid gel.

(D) Recovery of the siliceous amino compound

The slurry was washed and filtered as in Example I. No visible solvent appeared in the filtrate thus indicating that the filter cake had retained the V.M. and P. Naphtha. The filter cake was dried at a temperature of 150° F. to 155° F. The filter cake ground readily and easily to a fine powder. The yield of product was 70 grams.

EXAMPLE VIII

(A) Preparation of the silica gel 8.4 grams of 96% sulfuric acid and 11 grams of ammonium hydroxide (28.7% $NH_3$) were added to 1,000 cc. of water with stirring. To this solution was then added dropwise, a solution of 60 grams of sodium silicate ($Na_2O:3.22SiO_2$) in 60 cc. of water. The resultant clear silica sol was heated to 80° C. whereupon the sol was changed to a very thin liquid gel. After an additional 10 minutes at 80° C., it became a viscous gel and 600 cc. of water was added to keep the silica gel mixable. To this silica gel was then added 4.0 grams of sodium fluosilicate. A diluted solution of 118 grams of a 40° Bé. sodium silicate ($Na_2O:3.22SiO_2$) solution in 118 cc. of water was prepared. Sulfuric acid (96%), 25 grams, was then dissolved in 142 cc. of water. The sulfuric acid was added to the silica gel, with stirring, at a temperature of 45° C. until the entire mass was acid to Congo red paper; whereupon the diluted 118 grams of sodium silicate and the remainder of the sulfuric acid not added previously was then added to the silica gel, care being taken to keep the acid always in excess and the reaction mass acid to Congo red paper. The reaction mixture was then agitated while heating to 55° C.

(B) Preparation of the partial amide salt 20 grams of the monoamide of hydrogenated tallow fatty acids and aminoethylethanolamine was melted at a temperature of from 85° C. to 90° C. To this melt was then added 7.8 grams of glacial acetic acid and the monoamide acetate was then dissolved in 250 cc. of water at a temperature of from 80° C. to 85° C. A clear solution was obtained.

(C) *Preparation of the siliceous amino compound*

A diluted solution of 111 grams of a 40° Bé. sodium silicate ($Na_2O:3.22SiO_2$) solution was added to 111 cc. of water. The partial amide salt prepared in paragraph B and this 111 grams of diluted sodium silicate solution were added with stirring to the silica gel of preparation A at a temperature of 55° C. During the addition, care was taken to keep the partial amide salt in excess. The resultant siliceous amino compound slurry was heated to 62° C. The pH of the slurry was 7.1. The slurry was heated with agitation to 85° C.

(D) *Recovery of the siliceous amino compound*

The siliceous amino compound was filtered and washed as in Example I. The filtration rate was 2 to 3 minutes for 1,000 cc. of filtrate. The washed filter cake was dried at a temperature of from 150° F. to 160° F. It ground readily and had a bulking value of 82 cc./77 cc. for a 10 gram sample. The shrinkage during drying was 25.9%. A yield of 105 grams of siliceous amino compound was obtained.

EXAMPLE IX

The purpose of this Example IX is to illustrate the use of a diamide in preparing a siliceous amino compound, and a preparation wherein the silica is present in stoichiometric amounts. Another purpose of this example is to show that the partial amide need not be completely soluble in the solution in order to use the process of this invention.

(A) *Preparation of the diamide acetate*

75 grams of the diamide of two moles of ethylhexoic acid and one mole of diethylene triamine was added to 90 grams of kerosene at a temperature of from 90° C. to 100° C., with agitation. To this was then added 13.8 grams of glacial acetic acid and the resultant diamide acetate agitated at a temperature of from 90° C. to 95° C. to prevent settling, because it was not completely soluble in the kerosene.

(B) *Preparation of the siliceous amino compound*

Sodium silicate ($Na_2O:3.22SiO_2$), 61.5 grams of a 40° Bé. solution, was diluted with 61.5 cc. of water at a temperature of 60° C. The diamide acetate and the sodium silicate solution were added slowly at the same time to the sodium fluosilicate solution. Care was taken to keep the partial amide salt in excess at all times.

A cream yellow dispersion formed. A sample of the filtrate had a pH of 6.0 and was adjusted to 6.3 by the addition of 7 cc. of a 50% sodium hydroxide solution. The reaction slurry was digested for 18 hours at room temperature.

(C) *Recovery of the siliceous amino compound*

After the digestion period, the slurry was heated with agitation to a temperature of 75° C. and the agitation was then halted so that the slurry could separate into two layers. The lower mother liquor layer, 1350 cc., was siphoned off. The siliceous amino compound was washed by agitating it with 1500 cc. of water at a temperature of 75° C. for a period of 15 minutes. After washing, the lower layer was siphoned off. The washed siliceous amino compound was dried at a temperature of 200° F. to 225° F. for 6 hours and drying was then continued at a temperature of from 160° F. to 180° F. for 24 hours.

The resultant siliceous amino compound was ground in a Raymond Laboratory Hammer Mill. The yield of product was 70 grams. The bulking value was 65 cc./59 cc. for a 10 gram sample.

The procedure of this Example IX was repeated except that no fluosilicate was used. In this non-fluosilicate preparation, the siliceous amino compound in the kerosene and water, was not as fine a dispersion as when sodium fluosilicate was used. A sample of the filtrate had a pH of 6.3. The bulking value of the siliceous amino compound prepared without using fluosilicate or fluosilicic acid was 50 cc./43 cc. for a 10 gram sample. As can readily be seen, the use of sodium fluosilicate enabled us to obtain a siliceous amino compound with a finer particle size, or/and porous particle agglomerates with a larger surface area. This is evident when the results of the bulking values are compared. Generally speaking, the higher the bulking value, the finer or more porous the particles.

EXAMPLE X

The purpose of this Example X is to illustrate the preparation of a siliceous amino compound using quaternary ammonium salts. The quaternary ammonium salts used were Arquad 2HT which is approximately 30% hexadecyl quaternary ammonium chloride and 70% octadecyl quaternary ammonium chloride by weight, obtained from Armour and Co.

(A) *Preparation of the quaternary ammonium salt*

Arquad 2HT, 134 grams, was dispersed in 200 cc. of water at a temperature of from 75° C. to 80° C. To this dispersion was then added and dispersed 9.3 grams of sodium fluosilicate. This entire mixture was agitated for 10 minutes at a temperature of 70° C. to 75° C.

(B) *Preparation of the siliceous amino compound*

Sodium silicate ($Na_2O:3.22SiO_2$), 270 grams of a 40° Bé. solution was diluted with 270 cc. of water. This sodium silicate dilution was added over a period of 10 minutes to preparation A which was agitated during the addition. A smooth buff colored slurry was formed. Hydrochloric acid (37% HCl), 55 grams, was diluted with 55 cc. of water, and was added dropwise to the entire reaction mixture. A sample of the filtrate of the smooth buff colored slurry had a pH of 6.55 and this was adjusted to 7.35 by the addition of 2 cc. of a 50% sodium hydroxide solution.

(C) *Recovery of the siliceous amino compound*

The entire reaction mixture was agitated for one hour at a temperature of 70° C. to 75° C. and then filtered and washed four times. Each wash was accomplished by washing the filter cake with 1500 cc. of water for 20 minutes at a temperature of 70° C. to 75° C. The siliceous amino compound was dried for 29 hours at a temperature of from 150° F. to 160° F. The yield of product was 164 grams. The bulking value was 90 cc./80 cc. for a 10 gram sample.

The above procedure was repeated except that no sodium fluosilicate was used herein. A grainy, rather than the smooth precipitate previously prepared, formed. The filtrate had a pH of 7.6. The slurry was mixed for one hour at a temperature of from 70° C. to 75° C. and the pH was adjusted to 7.2 by the addition of 2 cc. of 37% hydrochloric acid. The yield was 165 grams of a gritty powder. The bulking value was 32 cc./30 cc. for a 10 gram sample.

One need only compare the bulking value of this product wherein no sodium fluosilicate or fluosilicic acid was used with the bulking value of the same product wherein sodium fluosilicate was used, to see the enhanced results due to the addition of sodium fluosilicate in preparing a siliceous amino compound.

EXAMPLE XI

The purpose of this Example XI is to illustrate that other fluosilicates and longer periods of digestion may be used. The fluosilicate used in this example was potassium fluosilicate.

(A) *Preparation of the silica gel*

Hydrofluosilicic acid (31.2% $H_2SiF_6$), 12.7 grams, and 3.1 grams of potassium hydroxide were added to 2,000 cc. of water to form potassium fluosilicate. Sodium silicate ($Na_2O:3.22SiO_2$), 250 grams of a 40° Bé. solution, was diluted with 250 cc. of water. 50 grams of 85% phosphoric acid was diluted with 270 cc. of water and the diluted sodium silicate and phosphoric acid solutions were added simultaneously to the potassium fluosilicate solution. Care was taken during the addition to keep the acid in excess so that the silica sol remained clear. The silica sol had a pH of 6.5 which was lowered to 5.5 by the addition of 6 cc. of phosphoric acid. Upon heating the silica sol to 40° C., the sol became a viscous silica gel.

(B) *Preparation of the partial amide salt*

12.5 grams of the monoamide of hydrogenated tallow fatty acids and aminoethylethanolamine was dissolved in 250 grams of "Varsol" at a temperature of 75° C. to 80° C. To this solution was then added 3.5 grams of glacial acetic acid. Sodium silicate ($Na_2:3.22SiO_2$), 152.5 grams of a 40° Bé. solution, was diluted with 152.5 cc. of water.

(C) *Preparation of the siliceous amino compound*

The partial amide salt of the sodium silicate dilution prepared above were added at the same time to the silica gel previously heated to a temperature of 55° C. During the addition, care was taken to keep the partial amide salt in excess at all times. The entire reaction slurry was heated to a temperature of 70° C. The reaction slurry was digested for 68 hours at room temperature. A sample of the filtrate had a pH of 6.9.

(D) *Recovery of the siliceous amino compound*

The reaction slurry was agitated and heated to a temperature of 55° C. and was then filtered and washed. The filter cake was dried at a temperature of from 150° F. to 160° F. for 24 hours. A yield of 128 grams of product with a bulking value of 82 cc./76 cc. for a 10 gram sample was obtained.

The above procedure was repeated except that no fluosilicate or fluosilicic acid was used. When preparing the silica sol, no gelation occurred as when a fluosilicate was added.

The reaction slurry was digested for 68 hours and heated to a temperature of 70° C., filtered, and washed. A yield of 129 grams of product with a bulking value of 60 cc./56 cc. for a 10 gram sample was obtained.

Again, comparison of the bulking values of similar preparations, except for the fact that no fluosilicate or fluosilicic acid was used in one of the preparations, shows the vast improvement obtained when a fluosilicate or fluosilicic acid is used in preparing a siliceous amino compound.

*Example XII*

The purpose of this Example XII is to illustrate the use of cocoamine, obtained from Armour & Co., and hydrofluosilicic acid in preparing a siliceous amino compound according to the process of this invention. The approximate composition of cocoamine by weight, is as follows: 8% octylamine, 9% decylamine, 47% dodecylamine, 18% tetradecylamine, 8% hexadecylamine, 5% octadecylamine and 5% octadecenylamine.

(A) *Preparation of the silica sol*

250 grams of a 40° Bé. sodium silicate ($Na_2O:3.22SiO_2$) solution was diluted with 250 cc. of water. A second solution composed of 220 grams of 31.2% hydrofluosilicic acid with 220 cc. of water was prepared. These two solutions were then added at the same time to 2,000 cc. of water. Care was taken during the addition to keep the hydrofluosilicic acid in excess at all times.

(B) *Preparation of the amine acid addition salts*

A solution of 14.8 grams of cocoamine in 250 grams of methylisobutyl ketone was prepared at a temperature of 20° C. to 25° C. To this cocoamine solution was then added 3.7 grams of glacial acetic acid. A clear solution of amine acetate was thus obtained. A dilution of 152.5 grams of a 40° Bé. sodium silicate ($Na_2O:3.22SiO_2$) solution with 152.5 cc. of water was prepared.

(C) *Preparation of the siliceous amino compound*

The amine acid addition salts and the sodium silicate solution just prepared were slowly added, at the same time, to the silica sol. The pH of the entire reaction mixture was adjusted to 6.2 by the addition of 6 cc. of a 50% sodium hydroxide solution.

The entire reaction slurry was then digested for 19 hours at room temperature and the pH was adjusted to 6.9 by the addition of 23 cc. of a 50% sodium hydroxide solution.

(D) *Recovery of the siliceous amino compound*

After the second adjustment of the pH of the reaction slurry, the entire slurry was filtered. Since the ketone used had some water solubility, a ketone-like odor was present in the filtrate. It should be noted however that most of the ketone remained dispersed within the siliceous amino compound. The slurry was filtered and washed three times at a temperature of from 15° C. to 20° C. It was then dried for 48 hours at a temperature of 150° F. to 160° F. A yield of 178 grams of product with a bulking value of 70 cc./65 cc. for a 10 gram sample was obtained.

EXAMPLE XIII

The purpose of this Example XIII is to illustrate the use of another fluosilicate, viz. ammonium fluosilicate, and a preparation using this fluosilicate wherein there was no digestion period.

(A) *Preparation of the silica sol*

To 2,500 cc. of water was added 4.2 grams of ammonium hydroxide (28.7% $NH_3$) and 16.2 grams of hydrofluosilicic acid. A clear solution of ammonium fluosilicate was thus obtained. A dilution of 250 grams of a 40° Bé. solution of sodium silicate ($Na_2O:3.22SiO_2$) with 250 cc. of water was prepared. A solution of 43.7 grams of 96% sulfuric acid in 215 cc. of water was prepared. The addition of the sulfuric acid dilution and sodium silicate dilution was accomplished in the manner of Example X. The resultant clear silica sol was heated to a temperature of 65° C.

(B) *Preparation of the partial amide salt*

The partial amide salt was prepared in the manner of Example X except that V.M. and P. Naphtha was used instead of the "Varsol" used in Example X.

(C) *Preparation of the siliceous amino compound*

The siliceous amino compound was prepared in the manner of Example X. The pH of the reaction slurry was 8.6 and was adjusted to 7.8 by the addition of 20 cc. of 10% sulfuric acid.

(D) *Recovery of the siliceous amino compound*

The entire reaction slurry was agitated, while heating to a temperature of 75° C., and was then filtered. There was no period of digestion used. The siliceous amino compound was washed and dried at a temperature of from 180° F. to 190° F. for a 24 hour period. A yield of 136 grams of product with a bulking value of 135 cc./120 cc. for a 10 gram sample was obtained.

The siliceous amino compounds prepared by the process of the present invention are useful in grease compositions as has been shown. In addition, they may be used as follows: to cure polyesters, as mold release agents, natural or synthetic rubber additives, stabilizers for halogen containing vinyl polymers, elevation of melting points, increase of hot viscosity of waxes and resins, thickeners for plastisols, plastigels and organosols, as a thermal insulating medium, wire drawing lubricants, flatting agents, as well as other uses.

As has been shown, the process using a water soluble fluosilicate salt or fluosilicic acid is a much improved process and produces a superior siliceous amino compound when compared to a process wherein no fluosilicate or fluosilicic acid was used. The siliceous amino compounds prepared by the process of this invention are easier to grind to a fine particle size and non-porous aggregate formation of the siliceous amino compound particles is greatly reduced. Using the process of this invention, it is possible to reduce the time of filtration encountered in U.S. Patent No. 2,967,828, Ihde, January 10, 1961, even without necessarily using a substantially water insoluble organic material as disclosed in patent application Serial No. 836,086, filed August 26, 1959.

While this invention has been described in terms of certain preferred embodiments and illustrated by means of specific examples, these are illustrative only, and the invention is not to be construed as limited, except as set forth in the following claims.

Having described our invention, what we claim as new and desire to secure by Letters Patent is:

1. In a process for preparing a siliceous amino compound by reacting (1) a material selected from the class consisting of water dispersible partial amide salts, water soluble partial amide salts, water dispersible amine acid addition salts, water soluble amine acid addition salts, imidazoline salts, oxazoline salts, water dispersible quaternary ammonium salts, and water soluble quaternary ammonium salts with at least a stoichiometric amount of (2) at least one water soluble silicate salt selected from the class consisting of sodium silicates, potassium silicates, and ammonium silicates, the step comprising the addition of at least one silicate derivative selected from the class consisting of fluosilicic acid and water soluble fluosilicate salts, said silicate derivative being present at the time of formation of the siliceous amino compound.

2. A process according to claim 1, wherein said water soluble silicate salt is present in stoichiometric amounts to said material.

3. A process according to claim 1, wherein said water soluble silicate salt is present in greater than stoichiometric amounts to said material.

4. A process according to claim 1, wherein said material and said water soluble silicate salts are reacted in the presence of a substantially water insoluble organic compound, said organic compound being a liquid at the operating temperatures of the process.

5. A process according to claim 1, wherein said silicate derivative is present in amounts of up to about 10 percent by weight based on the weight of the silicate derivative added therein and the theoretical yield of the siliceous amino compound with the proviso that when silica is present, said percent of said silicate derivative is based upon the total weight of said silicate derivative, said theoretical yield of siliceous amino compound and said silica.

6. A process according to claim 1, wherein 5% of said silicate derivative is present based on the weight of the silicate derivative added therein and the theoretical yield of the siliceous amino compound with the proviso that when silica is present, said percent of said silicate derivative is based upon the total weight of said silicate derivative, said theoretical yield of siliceous amino compound and said silica.

7. A process according to claim 1, wherein said silicate derivative is fluosilicic acid.

8. A process according to claim 1, wherein said silicate derivative is sodium fluosilicate.

9. A process according to claim 1, wherein said silicate derivative is potassium fluosilicate.

10. A process according to claim 1, wherein said silicate derivative is ammonium fluosilicate.

11. A process according to claim 1, wherein said silicate derivative is magnesium fluosilicate.

12. A process according to claim 1, wherein said partial amide salt is a salt of the monoamide of hydrogenated tallow fatty acids and aminoethylethanolamine.

References Cited in the file of this patent
FOREIGN PATENTS
565,662     Great Britain _____ Aug. 29, 1951

UNITED STATES PATENT OFFICE
CERTIFICATE OF CORRECTION

Patent No. 3,168,539            February 2, 1965

Frederick J. Ihde, Jr., et al.

It is hereby certified that error appears in the above numbered patent requiring correction and that the said Letters Patent should read as corrected below.

Column 7, line 66, for "non-volatlle" read -- non-volatile --; column 11, line 16, for "30° C." read -- 80° C. --; line 18, for "23" read -- 28 --; lines 20 and 21, for "temperatures" read -- temperature --; line 21, for "43" read -- 48 --; line 24, for "40 cc./33 cc." read -- 40 cc./38 cc. --; line 74, for "23.3%" read -- 28.3% --; column 17, line 17, for "$Na_2:3.22SiO_2)$" read -- $(Na_2O:3.22SiO_2)$ --.

Signed and sealed this 19th day of April 1966.

(SEAL)
Attest:

ERNEST W. SWIDER
Attesting Officer

EDWARD J. BRENNER
Commissioner of Patents